United States Patent [19]

Eklund et al.

[11] 4,161,132

[45] Jul. 17, 1979

[54] SELF-TAPPING SCREW

[75] Inventors: Ingvar A. Eklund, Hallstahammar; Sixten H. Lejdegard, Ramnas, both of Sweden

[73] Assignee: Bulten-Kanthal Aktiebolog, Hallstahammar, Sweden

[21] Appl. No.: 858,042

[22] Filed: Dec. 6, 1977

Related U.S. Application Data

[63] Continuation of Ser. No. 692,738, Jun. 4, 1976, abandoned.

[30] Foreign Application Priority Data

Jun. 5, 1975 [SE] Sweden ............................ 7506443

[51] Int. Cl.² ...................... F16B 25/00; F16B 33/02
[52] U.S. Cl. ........................................................ 85/47
[58] Field of Search ................... 85/16, 47; 10/152 T

[56] References Cited
U.S. PATENT DOCUMENTS

| 1,088,892 | 3/1914 | Foreman | 85/47 |
| 2,703,419 | 3/1955 | Barth | 85/47 UX |
| 3,200,691 | 8/1965 | Neuschotz | 85/47 |
| 3,209,383 | 10/1965 | Carlson | 85/47 X |
| 3,362,281 | 1/1968 | Finlay | 85/47 |

FOREIGN PATENT DOCUMENTS

| 110547 | 6/1964 | Czechoslovakia | 10/152 T |
| 814358 | 9/1951 | Fed. Rep. of Germany | 85/47 |
| 439636 | 9/1948 | Italy | 85/47 |
| 4743103 | 11/1972 | Japan | 85/47 |
| 286968 | 2/1965 | Netherlands | 85/47 |
| 4149 of | 1907 | United Kingdom | 85/47 |
| 171334 | 11/1921 | United Kingdom | 85/47 |
| 667051 | 2/1952 | United Kingdom | 85/47 |

*Primary Examiner*—Thomas J. Holko
*Attorney, Agent, or Firm*—Hill, Van Santen, Steadman, Chiara & Simpson

[57] ABSTRACT

A self-tapping screw, particularly for use in hard materials, such as bricks, concrete and rock, having a screw thread comprising a plurality of circumferentially successive thread portions between which there are voids, wherein at least the front end of each such thread portion is smoothly rounded from the central essentially cylindrical core portion of the screw and rearwardly toward the apex of the screw thread portion.

3 Claims, 5 Drawing Figures

SELF-TAPPING SCREW

This is a continuation of application Ser. No. 692,738, filed June 4, 1976, now abandoned.

BACKGROUND OF THE INVENTION

1. Field of the Invention

The invention relates to a self-tapping screw, particularly for use in hard materials, such as bricks, concrete and rock.

2. Prior Art

A conventional self-tapping screw resembles a threadforming tap in that the threads thereof at one or more places circumferentially are cut off transversely to form sharp cutting edges which cut threads in the workpiece in which the screw is applied. Normally, screws of this type are used in sheet metal, plastic and to a certain extent in light weight concrete.

Further, screws having a generally triangular cross-section have been proposed. On such screws each turn of the thread forms three radially extending lobes between which the thread turn runs comparatively straight. The intention is that the lobes shall form threads in the workpiece, in which the screw is applied, by a plastic deformation. Also screws of this type are normally used in sheet metal, plastic and, to a certain extent, in light weight concrete.

Thread cutting screws of the first mentioned type can, for obvious reasons, not be used in hard materials, such as bricks, concrete and rock; a thread cutting in such materials is not possible. Neither are the plastically deforming, self-tapping screws useful in such hard materials.

SUMMARY OF THE INVENTION

According to the invention there is provided a self-tapping screw which meets the above mentioned requirement of being useful in such hard materials as bricks, concrete, rock and the like.

In a self-tapping screw according to the present invention, the thread or threads of the screw comprises a plurality of circumferentially successive thread portions between which voids are formed, at least the front end of each such thread portion, as seen in the tightening direction of the screw, being smoothly rounded off from the central, essentially cylindrical stem of the screw and rearwardly towards the apex of the screw thread portion.

IN THE DRAWING

DESCRIPTION OF PREFERRED EMBODIMENTS

Figure 1:
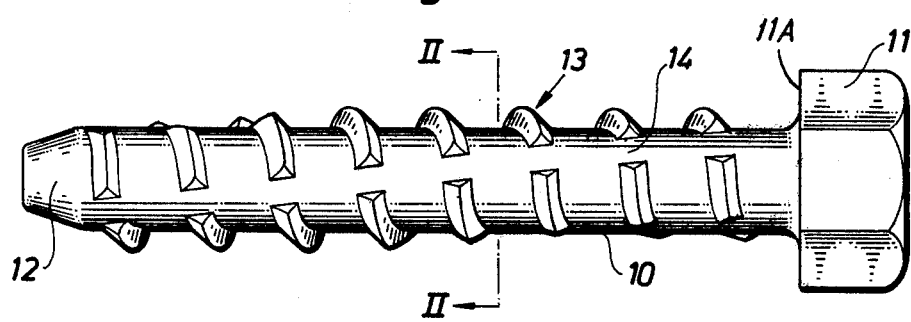
FIG. 1 is a side-view of one embodiment of a self-tapping screw according to the invention.
Figure 2:
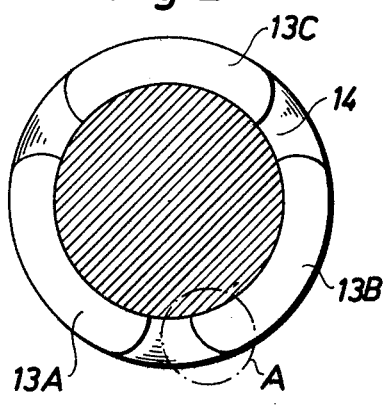
FIG. 2 is a cross-section of the screw taken along the line II—II of FIG. 1.

The self-tapping screw shown as an example in FIG. 1 comprises a threaded core or stem 10 having a single cylinder surface of uniform diameter, at one end of which is a head 11, the head 11 having a planar annular surface 11A which merges or blends smoothly into such cylinder surface. The head 11 has a conventional hexagonal periphery. A tip 12 of the screw stem is slightly conical but other tip forms can be used.

A screw thread 13 comprises a plurality of helicoidally successive thread portions 13A, 13B, 13C, between which there are openings or voids 14. At least the front end of each thread portion, in the tightening direction, such as the end 15 in FIG. 3, is smoothly rounded, but both the front end and rear end of each thread portion may be smoothly rounded.

Figure 3:
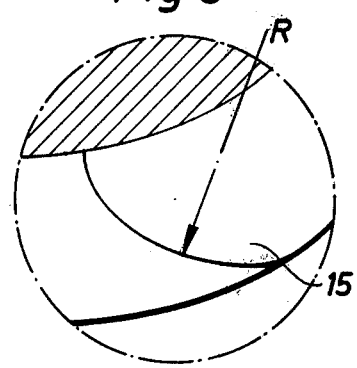
FIG. 3 shows an enlarged view of that portion of FIG. 2 which is enclosed by the circle A.

The radius R of curvature (FIG. 3) of the front ends of the thread portions is dimensioned in accordance with the main field of use in each case, and may be in the range of e.g. 0.5–2.0 times the radial height of the thread portions above the cylindrical surface of the screw stem, and the arc of curvature may be nearly entirely circular or have the shape of a somewhat straightening curve, such as shown in FIG. 3. The just mentioned radial height of the thread portions may be on the order of e.g. 10–15% of the outer diameter of the screw thread. The length of the thread portions 13A, 13B, 13C circumferentially of the screw may be such that three thread portions with intermediate voids are provided for each thread turn, and if desired, they may be slightly staggered circumferentially so that axially corresponding voids 14 are disposed along a helix having a large pitch in one or the other direction.

Preferably, the thread comprising the thread portions 13A etc. has such a width, i.e. the dimension axially of the screw, and such a screw pitch, that the screw stem has cylindrical surface portions between the individual turns of the screw thread.

Figure 4:
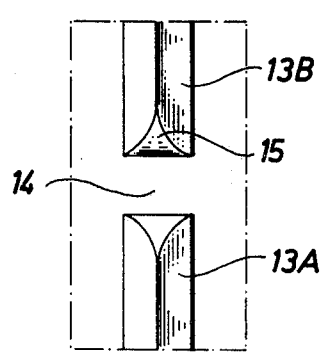
FIGS. 4 and 5 show in development two slightly different thread portion configurations.
Figure 5:
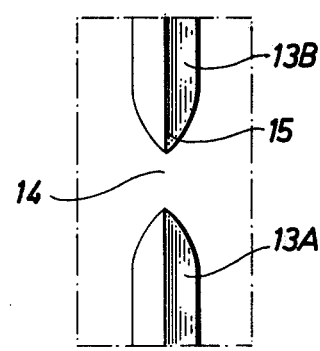

As shown in FIGS. 4 and 5 the ends of the thread portions may be formed either so that the apexes of the thread portions have a constant diameter, FIG. 4, or so that the apexes of the thread portions are curved downwardly, towards the cylindrical screw stem surface.

On application of a screw according to the invention into a prebored hole in a body of hard material of the above mentioned class, the rounded thread portion ends will crush the material of the hole walls into a very fine powder which is easily pushed away on opposite sides of the screw thread and thus a very durable thread is formed in the material by crushforming.

Modifications and alterations as to details may be carried out within the scope of the inventive idea.

What we claim is:

1. A self-tapping screw for use in pulverable materials consisting of bricks, concrete and rock, comprising:
    (a) a core having a single cylindrical surface of uniform diameter with a head at one end and a tip at the opposite end, said head having a planar annular surface merging smoothly with said cylindrical surface; and
    (b) a helical screw thread projecting radially from said cylindrical surface said thread comprising a plurality of circumferentially successive thread portions per revolution, each portion extending circumferentially at least 90 degrees and having a full radial height for a majority of such extent, between which portions there are voids of several degrees flush with said cylindrical surface, the leading and trailing ends of each of said thread portions respectively beginning substantially radially and convexly at said cylindrical surface, and being smoothly rounded into the apex of said screw thread portion, portions of said single cylindrical surface surrounding each of said thread portions individually.

2. A screw according to claim 1, the radius of curvature of each said leading and trailing end being between one-half the radial height of said thread portion above the cylindrical surface of said core and twice said radial height.

3. A screw according to claim 1, the shape of both of said rounded ends having an arc line which extends radially outwardly from said cylindrical surface and then flattens circumferentially by merging with a circular arc.

* * * * *